United States Patent [19]

Blodgett

[11] Patent Number: 5,760,740
[45] Date of Patent: Jun. 2, 1998

[54] APPARATUS AND METHOD FOR ELECTRONIC POLARIZATION CORRECTION

[75] Inventor: James Russell Blodgett, Derry, N.H.

[73] Assignee: Lucent Technologies, Inc., Murray Hill, N.J.

[21] Appl. No.: 512,503

[22] Filed: Aug. 8, 1995

[51] Int. Cl.$^6$ .................. H01Q 21/06; H01Q 21/24; H04B 7/10
[52] U.S. Cl. ............................................. 342/362
[58] Field of Search ............................ 342/361, 362, 342/363, 364, 365, 366; 455/63

[56] References Cited

U.S. PATENT DOCUMENTS

| | | |
|---|---|---|
| 4,106,015 | 8/1978 | Beguin et al. |
| 4,283,795 | 8/1981 | Steinberger ............................ 455/283 |
| 4,313,220 | 1/1982 | Lo et al. ................................ 455/304 |
| 4,723,321 | 2/1988 | Saleh .................................... 455/295 |
| 5,027,124 | 6/1991 | Fitzsimmons et al. ............... 342/362 |
| 5,298,908 | 3/1994 | Piele .................................... 342/363 |

*Primary Examiner*—Theodore M. Blum

[57] ABSTRACT

Disclosed is a cross-polarization cancellation apparatus and method particularly useful in a frequency reuse system, including a dual-polarized receiving system that receives a first electromagnetic signal having frequencies within a given frequency channel, which signal is transmitted from an external source at a first polarization. The receiving system also receives a second signal having frequency components within the given frequency channel which was transmitted at a second, different polarization. Received cross polarized energy of the second signal is cancelled by employing an antenna for receiving the first and second signals and for providing first and second antenna output signals containing received energy arriving at the antenna at the respective first and second polarizations. A novel circuit arrangement applies the antenna output signals to a combiner at an optimized relative amplitude and phase to substantially cancel the received cross polarized energy of the second electromagnetic signal.

19 Claims, 7 Drawing Sheets

APPARATUS AND METHOD FOR ELECTRONIC POLARIZATION CORRECTION

FIELD OF THE INVENTION

This invention relates generally to a system for reducing cross polarization interference in a wireless transceiver system. More particularly, it relates to a cross polarization cancellation system for use in a frequency reuse system in which a dual polarization receiving system is employed to receive signals in a plurality of overlapping frequency channels, with each frequency channel originally transmitted with a known polarization.

BACKGROUND OF THE INVENTION

Figure 1:
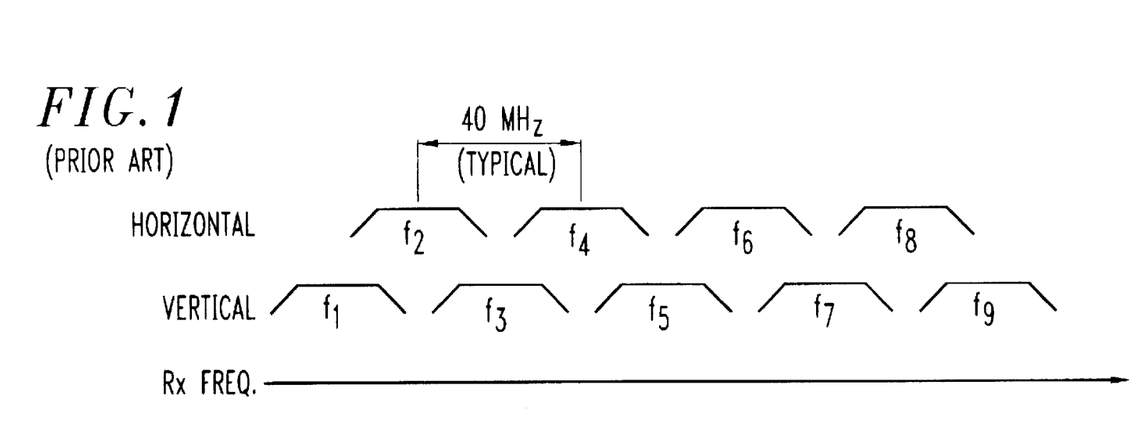
FIG. 1 illustrates overlapping frequency channels in a prior art frequency reuse system.

Communication satellite systems characteristically use dual-linear or dual-circular polarization in order to increase the usable bandwidth of the system. This approach is generally referred to as frequency reuse. A typical dual-linear frequency reuse system will transmit and receive half of the frequency channels with vertical polarization and the other half with horizontal polarization. As illustrated in FIG. 1, adjacent channels are transmitted at orthogonal polarizations to allow the usable frequency channels to overlap with one another. Thus, the "even" blocks of frequencies with carriers at f2, f4, f6, f8 (typically spaced 40 MHz apart), are polarized with horizontal polarization while the "odd" blocks of frequencies with carriers at f1, f3, . . . f9, are polarized with vertical polarization. (The selection of even and odd frequency blocks in an arbitrary one). A dual-circular polarization system would operate similarly—the even blocks of frequencies would be polarized with right hand circular polarization while the odd blocks would be polarized with left hand circular polarization, or vice versa.

While the above technique essentially doubles the usable bandwidth of the satellite system, several problems are apparent. Users of the satellite system must not only be able to transmit and receive on both polarizations, but must also maintain sufficient isolation between the polarizations. This may not be problematic for systems with large earth stations using superior but costly antenna feeds and automatic tracking and polarization control systems. As for the more common type of user, e.g., a cable television (CATV) operator who has several small antennas receiving analog or digital television programming from multiple satellites, the cost of the installation is of the utmost importance and simplicity is desired.

For linear polarization systems, polarization isolation is limited by several factors, including the quality of the antennas and their feeds, the accuracy to which the feeds are oriented, time of day and time of year, and perhaps most important, the amount of rainfall. In addition, if a single antenna is used for multiple satellites without adjusting the feed for optimum polarization isolation, the cross polarization interference between adjacent channels may be unacceptably high. For circular polarization systems, the quality of the antennas and their feeds, and the amount of rainfall are the major factors. Circular polarization systems typically use a waveguide circular to linear polarization converter in the antenna feed, and therefore the inherent feed isolation is typically poorer than for a linear polarization system.

The inherent polarization isolation of antenna feeds for small earth stations such as those used by a CATV operator may be as poor as 20 dB. The quality of the feed may not be the major impairment—for linear polarization systems any misadjustment of the feed angle will degrade isolation by 20 Log of the tangent of the angle of the misadjustment. This angle is of course affected by the accuracy with which the feed angle is initially set, as well as changes in the ionosphere that produce Faraday rotation, and changes that result from steering an antenna from one satellite to another. For circular polarization systems, the feed angle with respect to the received signal is not a factor; however the angle of the polarization converter with respect to the rest of the feed is a factor. This may be precisely set at a single frequency but may not be optimum at all frequencies in use.

A significant factor for either linear or circular polarization systems is depolarization due to rainfall. This is significant particularly at Ku-band frequencies which are commonly used for CATV feeds. When polarization discrimination is reduced below a certain level (which may vary from 10 to 30 dB depending upon the application), system performance will begin to suffer.

Several earth stations employ motor driven mechanical polarization correction schemes to automatically correct for depolarization. Such systems are notorious for being overly complex and unreliable; as such, these mechanical systems are not presently in wide use.

SUMMARY OF THE INVENTION

The present invention is directed towards a cross-polarization cancellation system for use in a dual-polarized receiving system that receives a first set of electromagnetic signals within a given frequency bandwidth, in which the first set of electromagnetic signals is transmitted from an external source at a first polarization. The receiving system also receives a second set of electromagnetic signals having frequency components overlapping those of the first set of signals within the given frequency bandwidth. The second set of electromagnetic signals is transmitted at a second, different polarization than the first polarization. Received cross polarized energy corresponding to the second set of electromagnetic signals is canceled with the cross polarization apparatus disclosed herein by employing at least one antenna for receiving the first and second set of electromagnetic signals and for providing a first antenna output signal containing received energy arriving at the antenna at the first polarization and a second antenna output signal containing received energy arriving at the antenna at the second polarization.

In a preferred embodiment, a first circuit arrangement is used to convert the first and second antenna output signals to first and second combiner input signals, respectively, at respective first and second input ports of a combiner. These first and second combiner input signals are provided with a controlled relative amplitude and a controlled relative phase with respect to one another, so that the combiner vectorially combines signal energies of these signals to provide a combiner output signal. A second circuit arrangement is utilized to detect signal energy of the combiner output signal to provide a detected signal. The first circuit arrangement is responsive to the detected signal to optimize the controlled relative amplitude and phase, whereby the combiner output signal contains energy associated substantially with the first electromagnetic signal and is substantially devoid of energy associated with the second electromagnetic signal.

The first circuit arrangement may include an I/Q vector attenuator to phase shift and attenuate the second antenna output signal, in which case control signals are supplied to the I and Q control inputs of the vector attenuator. The I and Q control signals are varied to continuously optimize the controlled relative amplitude and phase.

A pseudo-random noise generator may be employed in conjunction with a pair of correlators and integrators to provide two uncorrelated pseudo-noise sequences that serve to independently vary the I and Q control signals. Using this technique, the I and Q control signals eventually converge to optimized voltage levels, whereby the cross polarized energy is substantially canceled.

BRIEF DESCRIPTION OF THE DRAWINGS

For a full understanding of the present invention, reference is had to an exemplary embodiment thereof, considered in conjunction with the accompanying drawings wherein like reference numerals depict like elements, for which.

DETAILED DESCRIPTION OF THE INVENTION

Figure 2:
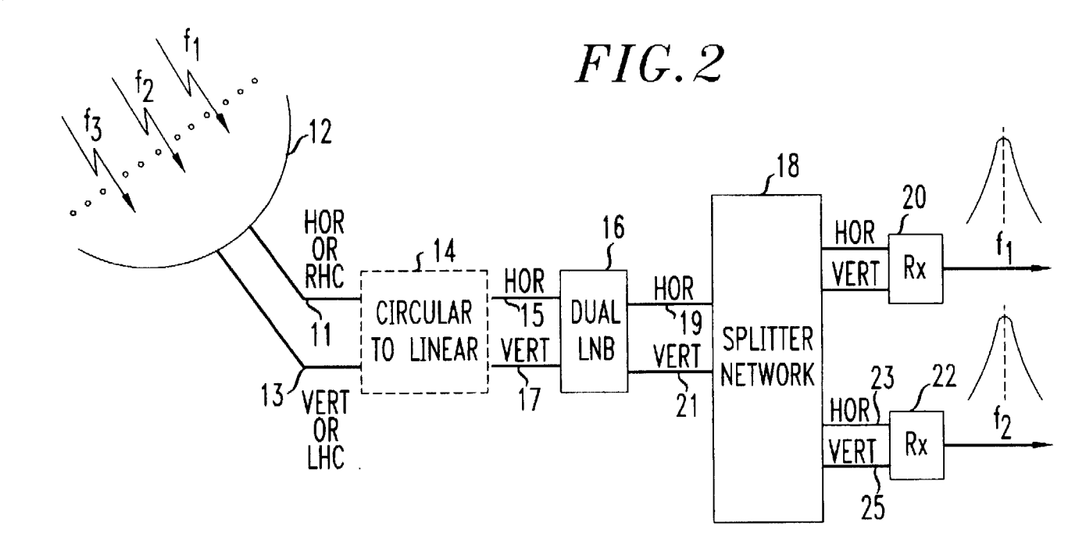
FIG. 2 is a block diagram of one embodiment of a cross-polarization cancellation system disclosed herein.

Referring to FIG. 2, there is shown a block diagram of a dual polarization receiving system 10 according to one embodiment of the present invention, which system receives first and second sets of signals transmitted in overlapping frequency blocks with alternating, different polarizations as was illustrated in FIG. 1. For example, the first set of signals is comprised of the "odd" frequency blocks centered about carriers at frequencies f1, f3, . . . , f9; the second set of signals consist of the "even" frequency blocks centered about carriers at frequencies f2, f4, . . . , f8. Each set of signals thus includes a plurality of bandwidth-limited channels. The receiving system 10 can be employed to receive microwave or millimeter wave transmissions such as in satellite to ground station links for cable television. Preferably, the receiving system 10 includes a plurality of receivers as 20, 22 with each receiver dedicated to receiving the signals of a given bandwidth-limited channel within a given set of signals. Hence, receiver 20 receives a channel having a bandwidth centered around a carrier of frequency f1, preferably down-converted to an IF carrier frequency f1"; receiver 22 receives a bandwidth-limited channel having a center frequency of f2, preferably down-converted to an IF carrier f2", and so on. Of course, if only one bandwidth-limited channel is desired to be received, only one receiver such as 22 will be required. (It is noted that in the alternative, each receiver can be dedicated to receiving the signals of more than one bandwidth-limited channel). In any event, because the bandwidth-limited channels of the first set of signals overlap respective bandwidth-limited channels of the second set of signals in a frequency reuse scheme where adjacent channels share some of the same frequencies, every receiver will receive unwanted cross polarized energy from the channels adjacent to the channel that receiver is dedicated to. Each receiver therefore includes cross polarization cancellation circuitry (to be described later) which will substantially cancel the unwanted cross polarized energy from at least the adjacent channels.

The receiving system 10 may be designed to receive frequency channels with polarizations that alternate between orthogonal linear polarizations such as horizontal and vertical, or between right hand circular (RHC) and left hand circular (LHC). An antenna 12 may be equipped with a dual polarized feed to receive the frequencies of all channels of interest, and to ideally provide the energy arriving at the antenna at one polarization at a first output port 11 and of the other polarization at a second output port 13. Alternatively, two antennas may be employed—one to receive horizontal or right hand circular polarization and another to receive vertical or left hand circular polarization. With the latter configuration, the first antenna output port 11 would be provided by one antenna while the second antenna output port 13 would be provided by the other antenna. In either case, if circular polarization is used, a circular to linear converter 14 is employed to convert the RHC energy to horizontal and the LHC to vertical, or vice versa. The following discussion will generally refer to a linear polarization transmit/receive system for convenience; however, it is understood that the invention is equally applicable to a system employing circular polarized transmissions.

In FIG. 2 as well as in the other figures herein, the labels "HOR" and "VERT" will be used at various circuit locations to represent signals with signal energy proportional to the signal energy supplied at the ports 11 and 13, respectively, of the antenna 12. The various "HOR" and "VERT" signals are of course no longer polarized—indeed, the HOR signals are a superposition of: 1) originally transmitted horizontally polarized signals that arrived at the antenna 12 co-polarized; 2) originally transmitted vertically polarized signals that arrived at the antenna 12 at horizontal polarization (i.e., cross polarized) due to rain depolarization or otherwise; and 3) originally transmitted vertically polarized signals that arrived co-polarized, but which wound up in port 11 due to feed misalignment of the antenna 12. Likewise, the VERT signals are a superposition of originally transmitted vertically polarized signals, and originally transmitted horizontally polarized signals that wound up in port 13 due to cross polarization or otherwise. Hereafter, when the term "cross-polarized" is used, it will refer to signal energy originally transmitted at one polarization which wound up at the antenna output port 11 or 13 that is dedicated to the orthogonal polarization. It is these cross polarized components of the HOR and VERT signals which will be canceled by circuitry within the receivers as 20, 22 to be described.

Figure 3:
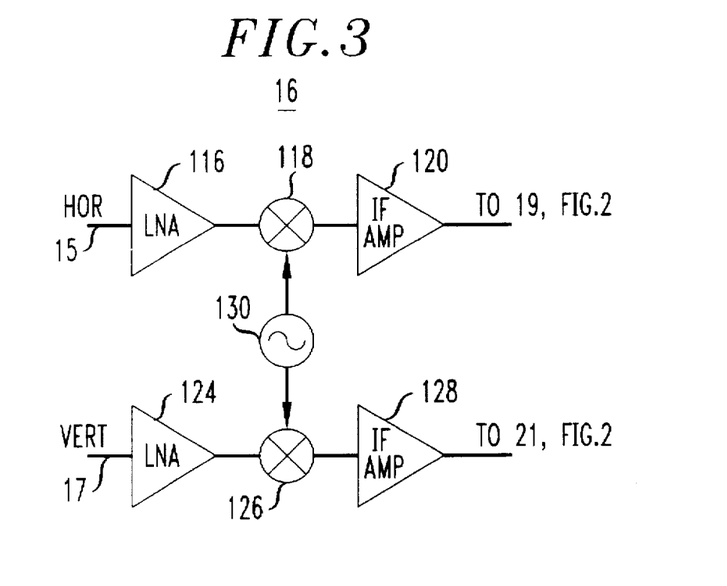
FIG. 3 shows a dual low noise block which can be used in the system of FIG. 2.

A dual low noise block (LNB) 16 is preferably employed to receive the HOR and VERT signals on input ports 15 and 17, respectively. As shown in FIG. 3, the dual LNB 16 includes low noise amplifiers (LNA) 116 and 124 for amplifying the respective HOR and VERT signals. A local oscillator 130 oscillating at a frequency "$f_{LO}$" is used to feed L.O. signal energy to a pair of mixers 118 and 126, thereby down-converting the received microwave or mm wave signals to intermediate frequencies (IFs) which may be between 1000 and 1500 MHz, for example. Hence the signal power at f1, . . . , $f_n$ is down-converted to corresponding power at IF frequencies f1'=$f_{LO}$–f1, . . . $f_n'$=$f_{LO}$–$f_n$. By employing the common local oscillator 130, coherency is maintained between the signals in both paths. IF amplifiers 120 and 128 then amplify the respective IF signals. In any event, while use of the dual LNB 16 is advantageous, the invention may also be carried out without down-converting the received signals provided that the transmission frequencies are not prohibitively high.

Referring again to FIG. 2, the HOR and VERT IF outputs of the dual LNB 16 are applied to respective input ports 19 and 21 of a splitter network 18. The splitter network 18 splits these signals into a plurality of outputs which are supplied to the receivers 20, 22, etc. Each receiver has both a HOR and VERT signal applied thereto with the amplitude and phase relationships between the two signals maintained as originally supplied by the antenna 12. Hence, the amplitude and phase relationships at corresponding frequencies between the two signals on input ports 23 and 25 of the receiver 22, will be the same as the relationship between the signals on input ports 19 and 21 of the splitter network 18, and the same (albeit down-converted) as that between the signals on ports 11 and 13 of the antenna 12.

Figure 4:
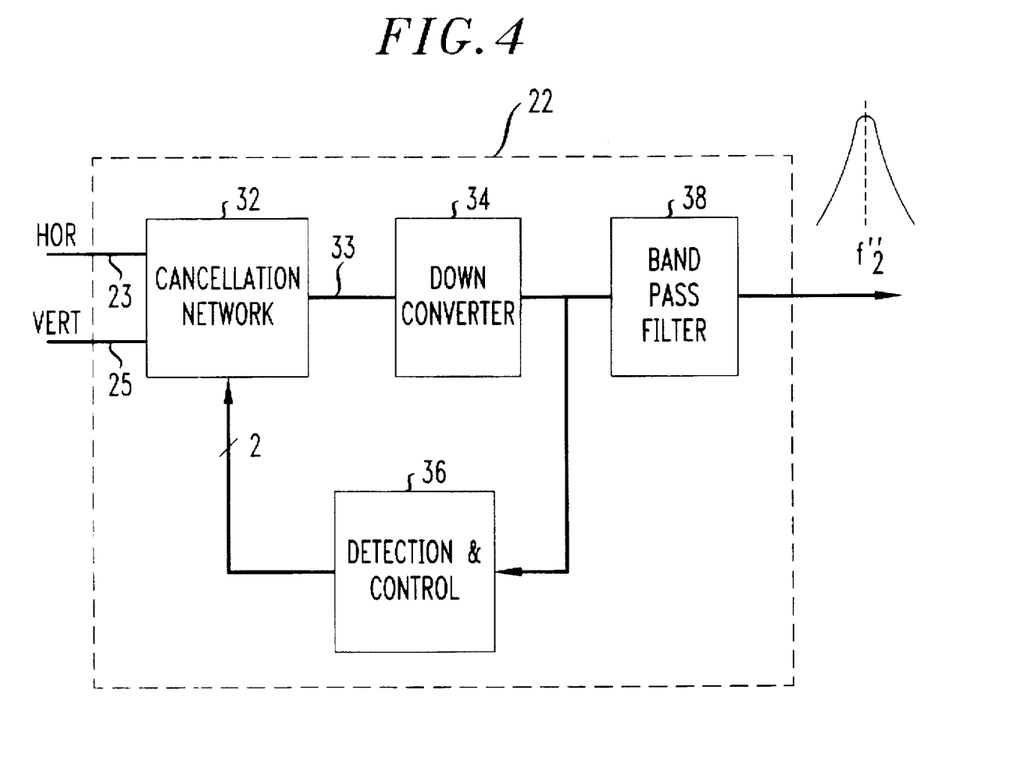
FIG. 4 depicts a configuration which may be used for the receivers of FIG. 2.

With reference now to FIG. 4, there is shown a block diagram which can be used as the basic configuration for the receiver 22 as well as for the other receivers. In the current example, the receiver 22 is designated to receive the f2 frequency block, i.e., the frequency channel with frequencies concentrated about the carrier f2 that was originally transmitted with horizontal polarization. Accordingly, the receiver 22 employs a cancellation network 32 to cancel received cross polarized energy that was originally transmitted as part of adjacent frequency blocks—i.e., from the f1 frequency block and the f3 frequency block. Cancellation of received cross polarized energy from the other odd frequency channels can also be achieved with the cancellation network 32. Cancellation is accomplished with the aid of a detection and control block 36 that provides the cancellation network with a pair of control signals to control the signal cancellation. A down-converter 34 is also preferably employed to allow for subsequent signal conditioning at lower IF frequencies—hence the energy at f1'....., $f_n$' will be down-converted to f1"....., $f_n$". While this second down-conversion is preferred, it is conceivable that the present invention embodiment could alternatively be implemented without a second down-conversion if so desired.

Figure 5A:
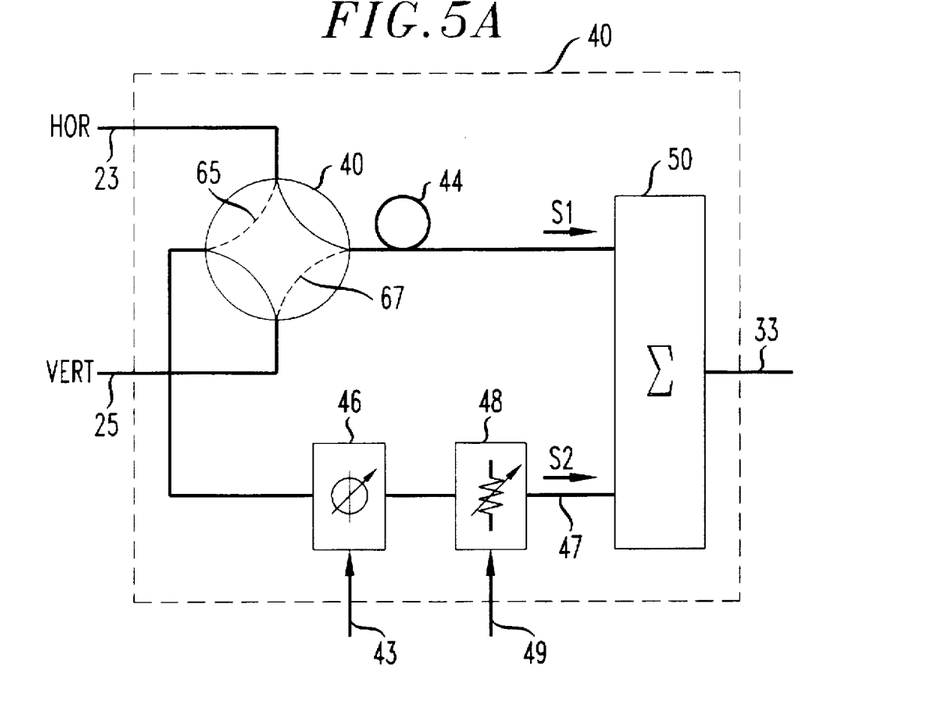
FIGS. 5A and 5B are embodiments of the cancellation network of FIG. 4.

Referring now to FIG. 5A, one embodiment of the cancellation network 32 is the shown circuit 40, including a transfer switch 42 with input ports 23 and 25. The transfer switch 42 which may be a conventional PIN diode switch, routes the HOR signal applied at port 23 to a delay line 44 which can be a fixed length of coaxial or microstrip transmission line. The output signal of the delay line 44, designated "S1", is applied to an input port 45 of a combiner 50, which may be a 3 dB in-phase type combiner.

Figure 6A:
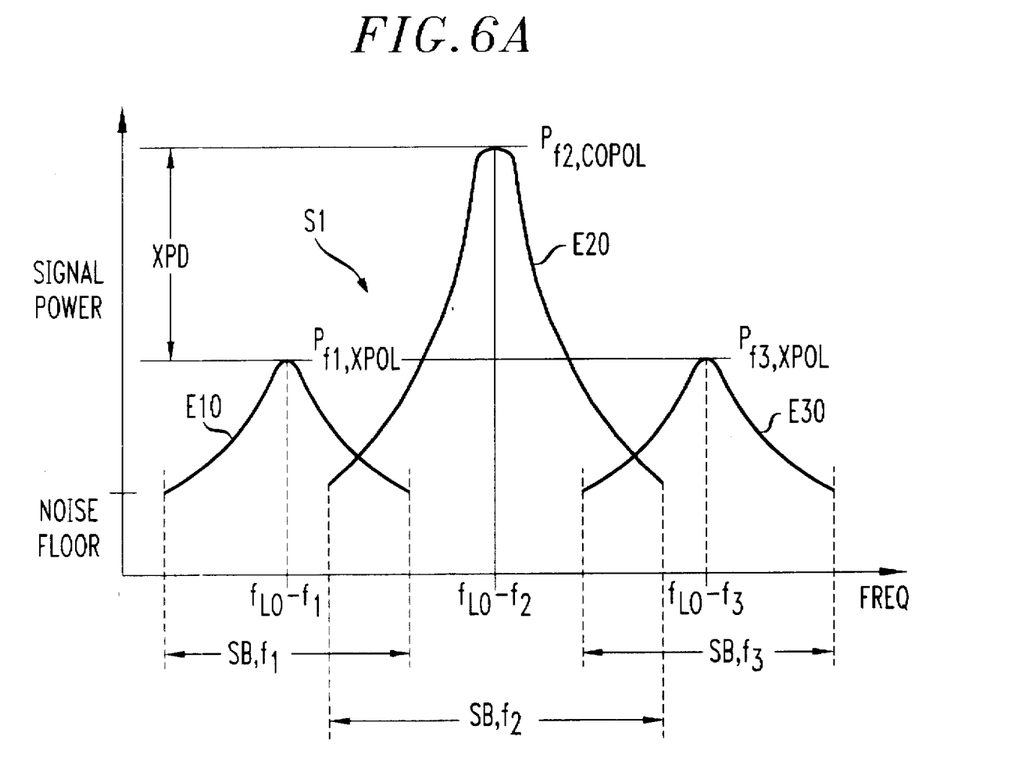
FIGS. 6A and 6B show exemplary signal envelopes of signals flowing within the circuits of FIG. 5.

As explained above, the HOR signal at the port 23 is a superposition of the received horizontally polarized energy of the even channels such as the f2 channel, as well as that of the odd channels such as the f1 channel. The horizontally polarized received energy of the odd channels is the unwanted cross polarized energy which shares some of the same frequencies as the even channels and hence causes interference. As shown in FIG. 6A, the S1 signal will consist of the vectorial combination of signal energies at the frequencies within the envelopes E10, E20 and E30. The E20 envelope contains the IF power corresponding to the horizontally polarized received energy of the f2 channel, with a peak power level of $P_{f2,COPOL}$ at the IF frequency of $f_{LO}$–f2. The E10 and E30 envelopes contain the IF power corresponding to the horizontally polarized received energy of the f1 and f3 channels, respectively, with peak power levels of $P_{f1,XPOL}$ and $P_{f3,XPOL}$ at IF frequencies of $f_{LO}$–f1 and $f_{LO}$–f3, respectively. The cross polarization discrimination "XPD" is the difference between $P_{f2,COPOL}$ and $P_{f1,XPOL}$ (or $P_{f3,XPOL}$), assuming that the signals S1, S2 and S3 all arrive at the antenna at the same copolarized power levels. XPD may typically be as high as 15 dB prior to the cross-polarization cancellation to be described. The signal bandwidth of the f2 channel "SB,f2" overlaps with the signal bandwidths of the f1 and f3 channels "SB,f1" and "SB,f3", respectively, but preferably does not extend to the f1 and f3 channel carrier frequencies f1'=$f_{LO}$–f1 and f3'=$f_{LO}$–f3, respectively. The S1 signal also contains received energy of the other even and odd channels such as the f4 and f5 channels which are omitted from FIG. 6A for convenience.

The unwanted cross polarized energy of the envelopes E10 and E30 is canceled with the present invention embodiment by applying a cancellation signal S2 to port 47 of the combiner 50 (see FIG. 5A). This cancellation signal is provided with signal energy of equal amplitude but opposite phase (180° out of phase) to that of the cross polarized energy of the S1 signal at corresponding frequencies (within the envelopes E10 and E30 of the current example). The combiner 50 then cancels the out of phase components by dissipating the energy therewithin in its internal load resistor, so that in the ideal case, a replica of the original, even frequency channel transmissions appears on the output port 33. (Much of the received cross polarized energy from the other odd frequency channels is also cancelled; however, subsequent filtering will filter unwanted frequencies from these channels anyway).

Figure 6B:
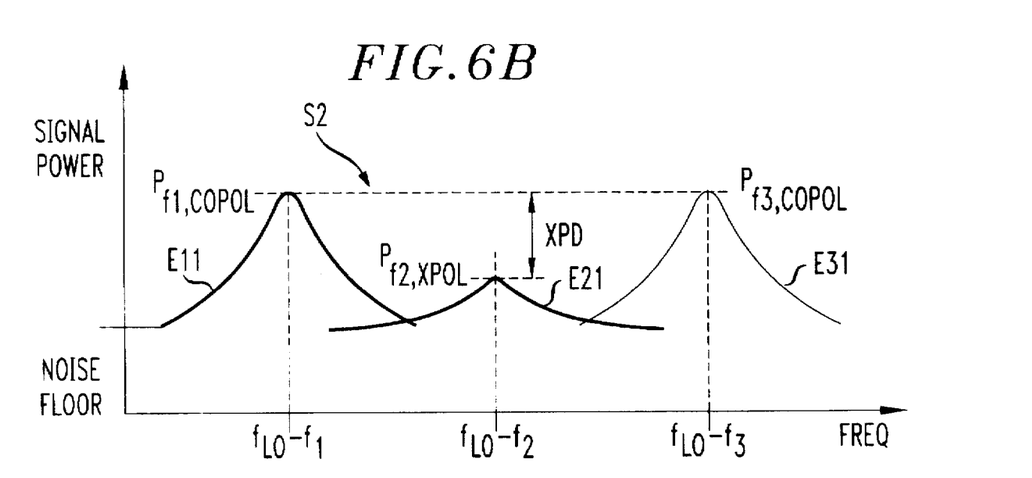

The S2 signal is illustrated in FIG. 6B where it is shown to consist of the combination of signal energies at the frequencies within the envelopes E11, E21 and E31. The signal energies at frequencies within the E11 and E31 envelopes are of the same amplitude level (after having been attenuated) as those within the respective envelopes E10 and E30 of FIG. 6A. That is, $P_{f1,COPOL}=P_{f1,XPOL}$ and $P_{f3,COPOL}=P_{f3,XPOL}$. (Typically, $P_{f1,COPOL}$ also equals $P_{f3,COPOL}$.) Each frequency component within the E11 and E31 envelopes is 180° out of phase with the corresponding frequency component within the E10 and E30 envelopes. The envelope E21 is an attenuated version of the E20 envelope, with a peak level of $P_{f2,XPOL}$. The cross-polarization discrimination XPD measured by the difference between $P_{f1,COPOL}$ and $P_{f2,XPOL}$ is the same as for the S1 signal. Since the E11 and E31 components of S2 cancel with the E10 and E30 components of S1, respectively, the signal on the combiner output port 33 will consist substantially of the signal energies within the E20 envelope, albeit attenuated by about 3 dB due to the operational characteristics of the combiner 50.

As shown in FIG. 5A, the cancellation signal S2 provided to the combiner 50 is essentially the VERT signal applied at port 25, phase shifted and attenuated in an optimized manner. In the circuit 40, the transfer switch 42 routes the VERT signal to a variable phase shifter 46. Thereat, it is phase shifted by an optimized phase which is controlled by a control voltage applied on line 43. The phase shifter 46 output signal is supplied to a variable attenuator 48 where it is attenuated by a value that is a function of a control voltage applied thereto on line 49. The attenuation value will be essentially the ratio of the cross polarized energy to the desired co-polarized energy which may be on the order of 20 dB. The control voltages on lines 43 and 49 are supplied from the detection and control block 36. It is noted that variable, voltage controlled phase shifters and attenuators suitable for the purposes described above are well known in the art and are widely available commercially from a variety of manufacturers.

The insertion delay of the series combination of the phase shifter 46 and attenuator 48, is matched by the delay line 44, so as to provide the S2 signal at a flat 180° phase offset from the S1 signal's cross polarized components over the frequency band of interest. It is noted that one skilled in the art will appreciate that the phase shifter 43 need not be disposed in series with the attenuator 49—it may alternatively be positioned in the other circuit path, i.e., anywhere between ports 23 and 45. In this case, the delay line 44 insertion delay characteristics will need to be adjusted accordingly. Moreover, it is possible to eliminate the attenuator 49 and substitute an amplifier in the other path; however, this approach is not the preferred one.

Figure 5B:
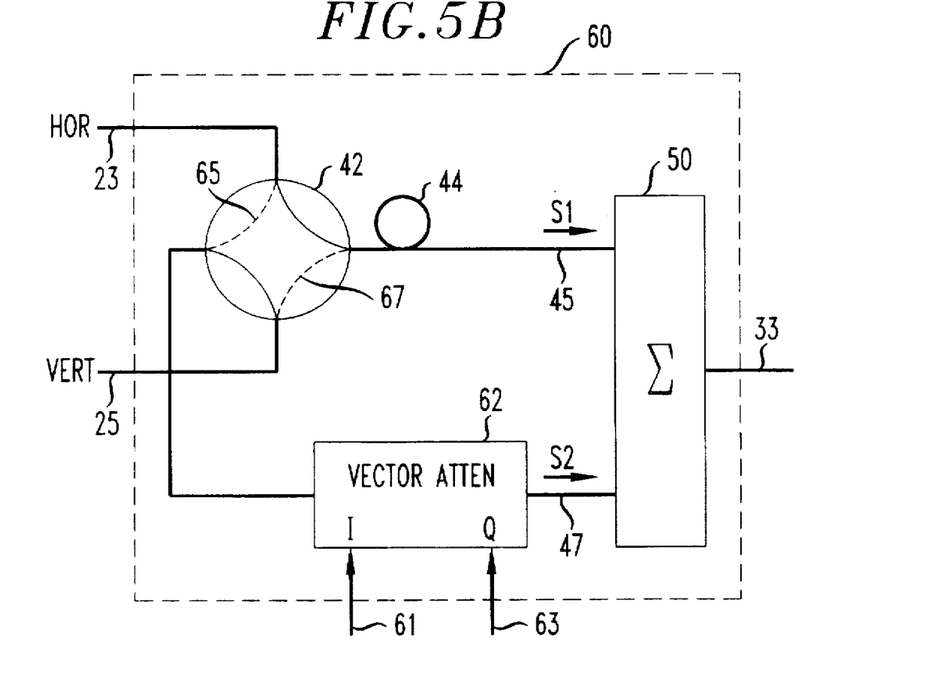

As shown in FIG. 5B, an alternate circuit configuration 60 which can be used for the cancellation network 32 is shown. The circuit 60 includes the same components as the circuit 40 of FIG. 5A except that a conventional vector I/Q attenuator 62 has replaced the variable phase shifter 46 and variable attenuator 48. The vector attenuator 62 has an "I" input port for receiving an "in-phase" control voltage on control line 61, and a "Q" input port for receiving a "quadrature phase" control voltage on control line 63, with both these control voltages being supplied by the detection and control block 36. The in-phase and quadrature control signals will enable the vector attenuator 62 to perform the same function as the combination of the phase shifter 46 and variable attenuator 48, which is to convert the VERT signal on line 25 to the aforementioned S2 signal, thereby affording the cross polarization cancellation. It is noted that the delay line 44 in the circuit 60 will of course be of a different electrical length than in the circuit 40 to compensate for the insertion delay (as a function of frequency) of the vector attenuator 62.

The foregoing description of the circuits 40 and 60 which produce the internal signals S1 and S2, has been tailored to the receiver 22 that is designated to receive the signal information within the f2 frequency channel, transmitted with horizontal polarization. The same circuit 40 or 60 can be used for the cancellation network 32 in any of the odd frequency channel receivers such as receiver 20 dedicated to receive the vertically polarized channel transmissions. For these receivers, the only difference is that the input-output paths of the transfer switch 42 will need to be switched so that the input port 23 connects to phase shifter 43 or vector attenuator 62, as indicated by the dotted lines 65 of FIGS. 5A and 5B. Likewise, the input port 25 will connect to the delay line 44 in the odd receiver channels, as indicated by the dotted lines 67. It is noted that while the transfer switch 42 is advantageous in that it allows all receivers to be interchangeable, it could be eliminated if desired whereupon phase matched cables would preferably be employed to directly connect the input ports 23, 25 to the desired components.

Figure 7:
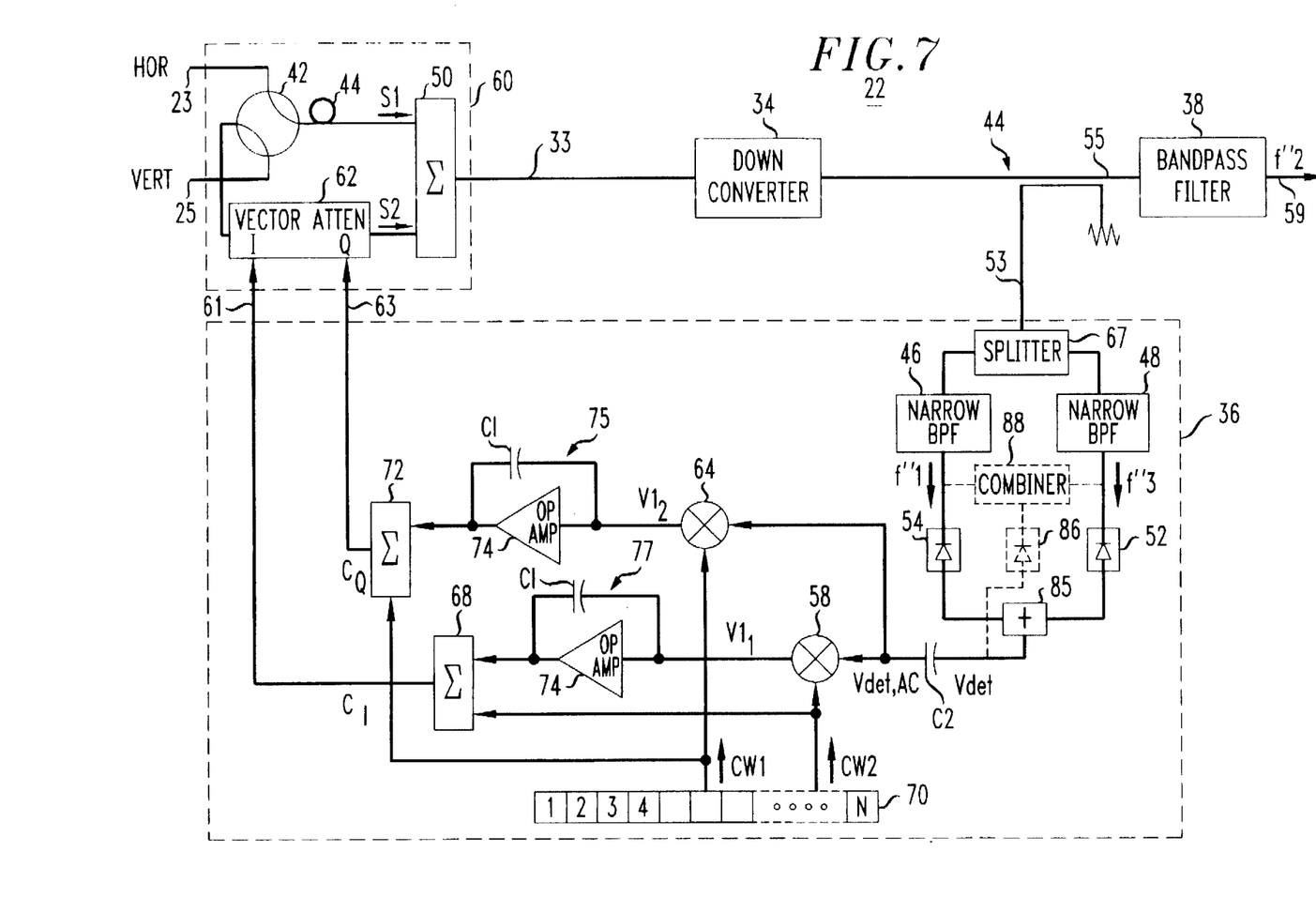
FIGS. 7–9 illustrate different detailed embodiments for the receivers of FIG. 2.

Referring now to FIG. 7, one configuration for the receiver 22 is shown which includes the cancellation network 60 controlled by an embodiment of the detection and control block 36. Optimum control voltages on the I and Q control lines 61 and 63, respectively, which produce the aforementioned optimized cancellation signal S2, are provided by the detection and control block 36 in the following manner. The vector attenuator 62 is set with initial I and Q settings to produce an initial attenuation corresponding to an approximate polarization isolation level which may range from 15-30 dB. The IF output signal energy of the combiner 50 is preferably applied to the down converter 34 where it is translated to correspondingly lower IF frequencies ranging from about 20-200 MHz. As explained previously, signal energy from the combiner output port 33 at the IF frequency f2' will be translated by the down converter 34 to proportional energy at the lower IF frequency f2"; energy at f1' will be translated to the lower frequency f1", and so on.

The same frequency spacings will be maintained to keep the baseband energy relatively constant—e.g., f2'-f1'=f2"-f1"; f3'-f2'=f3"-f2". A coupler 44 then couples the down-converted IF to a coupled output line 53, which is then advantageously split and applied to a pair of narrow band pass filters 46 and 48. The direct path output of the coupler 44 on line 55 is supplied to another bandpass filter 38.

As an illustrative example, it will be assumed that the carrier frequency f2 is 20 MHz higher than the carrier frequency f1 and 20 MHz lower than the carrier frequency f3. Accordingly, (f2"-f1")=(f3"-f2")=20 MHz. It is also assumed that the total signal bandwidth "SB.f2" of the f2 channel is less than 40 MHz (with the signal bandwidth on each side of the carrier f2 less than 20 MHz.) Consequently, if the cancellation network 60 provided perfect cross polarization cancellation, the signal at the coupler 44 would be devoid of signal energy at the down converted "odd" carrier frequencies such as f1" and f3" (e.g. −50 MHz and 90 MHz, respectively). Accordingly, by designing the bandpass filters 46 and 48 with sufficiently high "Q factors" (i.e.—sufficiently narrow), and with resonant frequencies at f1" and f3", respectively, then the power concentrated about these resonant frequencies can be measured exclusively using diode detectors 54 and 52. When minimum power at f1" and f3" is detected, the received cross polarized energy is substantially canceled and the input to the bandpass filter 38 on line 55 will be a down-converted replica of the originally transmitted horizontally polarized "even" channels. Preferably, the bandpass filter 38 has a resonant frequency at the translated carrier frequency f2" and is narrow enough to filter out the signals of the other even channels. In this manner, the receiver 22 will be dedicated only to receiving the signal information of one channel.

In the alternative, the bandpass filter 38 could actually consist of several bandpass filters connected in parallel, with each one having a resonant frequency at one of the even frequencies. In this case, the output of each one of the several filters would be routed to a signal processor for further processing, whereby the signal information of the several even channels would be obtained with one receiver as 22. This approach has obvious advantages; however, bandwidth limitations limit its practical implementation.

In the exemplary embodiment of FIG. 7, voltages supplied by the diode detectors 52 and 54 which correspond to the powers detected, are added by means of an adder circuit 85 to produce a voltage Vdet. In an alternate configuration (indicated by the shown dotted lines), the IF power passing through the filters 46 and 48 would first be combined by a combiner 88, and the combined output power detected by a single detector 86 having sufficient bandwidth. In yet another alternate configuration, the splitter 67 could be eliminated and only one filter and detector in series could be employed such as filter 46 and detector 54. In either case, Vdet is the detected envelope of the signal and noise power at the output of the narrowband filters or filter, as the case may be. The signal component of Vdet consists mainly of the cross-polarized signal which is desired to be cancelled, but also contains some of the co-polarized signal. This is because the narrowband filters do not have perfect rejection, nor do they need to. It is only necessary to "weight" the signal at the detectors 54 and 52 (or 86) so as to contain mostly the cross-polarized signal. The weighting is a function of the roll-off and the exact resonant frequencies of the narrowband filters, in conjunction with the frequencies of overlap between the co-polarized and cross-polarized signals. The ratio to which the signal to be detected is weighted is the same as the degree to which the cross-polarized signal can be cancelled in the system disclosed herein. For example, if the signal to be detected is weighted with 20 dB more power from the cross-polarized signal than from the co-polarized signal, and the input cross-polarization ratio was 15 dB, then the output ratio would be 35 dB. In addition to the cross-polarized and co-polarized signals, there is also noise present at the narrowband filter outputs which is detected. This noise will add to the D.C. component of Vdet.

In either of the foregoing detection arrangements, the detected voltage Vdet is applied to a D.C. blocking capacitor C2 which blocks the D.C. component of Vdet and supplies its A.C. component $Vdet_{AC}$ to a pair of correlators 58 and 64. Simultaneously, the correlators 58 and 64 receive uncorrelated pseudo-random sequences CW1 and CW2, respectively, from a pseudo-noise (PN) generator 70. As is well known, pseudo-noise generators are widely used in a variety of wideband and secure communications systems such as in spread spectrum communications applications, and are also used in Monte-Carlo integration and simulation programs. Two basic structures for generating PN sequences are binary shift registers (BSRs) and linear congruent algorithms (LCAs). Basically, a PN sequence is a noise-like codeword of positive and negative pulses which resembles a random sequence. Accordingly, when the positive and negative pulses of the CW1 sequence is averaged over a relatively large time interval, the average voltage will be zero; the same holds true for the CW2 sequence. Also, the cross-correlation of CW1 and CW2 will be zero.

Each correlator 58 and 64 is responsive to the time varying signal $Vdet_{AC}$ over a given time interval. This given time interval may correspond to one period of each pulse in the PN sequence CW1 or CW2. Each correlator 58 and 64 multiplies $Vdet_{AC}$ by the instantaneous voltage level of the respective CW1 or CW2 sequence, to produce time-varying multiplied voltages Vi1 and Vi2, respectively. The voltages Vi1 and Vi2 are then applied to integrators 77 and 75, respectively, where each integrator may minimally consist of an operational amplifier 74 with a feed-back capacitor C1. A summer 72 is employed to sum the integrator 75 output voltage with the voltage pulses of the CW1 sequence to provide a "quadrature-phase" control voltage $C_Q$ that is applied on control line 63 to the vector attenuator's Q control port. Likewise, summer 68 sums the integrator 74 output voltage with the voltage pulses of the CW2 sequence to provide an "in-phase" control voltage $C_I$, applied on control line 61 to the vector attenuator's I control port. (It is understood that if the variable phase shifter 46 and variable attenuator 48 of FIG. 5A were being used in place of the vector attenuator 62, the control signals $C_I$ and $C_Q$ would be tailored to control those components). Since each integrator output voltage is relatively constant as compared to the fast changing voltage pulses of the PN sequences CW1 and CW2, each pulse of the PN sequence produces an instantaneous change in the vector attenuator 62 characteristics, in turn producing the time varying change $Vdet_{AC}$ corresponding to the change in power detected by detectors 52 and 54. This change $Vdet_{AC}$ consists of the combination of a change ΔVdet1 due to the perturbation on the Q control port which is correlated with the CW1 sequence, and a change ΔVdet2 due to the perturbation on the I control port correlated with the CW2 sequence. As such, the time varying power measured by the detectors 46 and 48 is correlated with the original PN sequences CW1 and CW2. Since these PN sequences are uncorrelated to one another, the voltages ΔVdet1 and ΔVdet2 are uncorrelated so that each is unaffected by perturbations in the other voltage.

The shown circuit arrangement 36 will thus allow a determination as to whether the I or Q control voltage corresponding to a "1" in the sequence (positive CW1 or CW2 voltage pulse), or a decrease in the I or Q control voltage corresponding to a "0" in the sequence (negative CW1 or CW2 voltage pulse), resulted in a decrease in the undesired signal power. The voltage components ΔVdet1 and ΔVdet2 of the voltage waveform $Vdet_{AC}$ are multiplied by the correlators 64 and 58, respectively, with the original positive or negative voltage pulse of the CW1 or CW2 sequence that caused the voltage change. In this fashion, each loop converges simultaneously and the undesired cross polarized signal is canceled. The circuit 36 then operates to adjust the control voltages $C_I$ and $C_Q$ continually, so that any changes in the cross polarization level will be compensated for immediately. Thus the system is ideal for use as an automatic, continually corrected cancellation system.

It is noted that the system will start with arbitrary initial values for the control voltages $C_I$ and $C_Q$. The correlators 58 and 64 then continuously compare the changes in Vdet produced by the PN sequences with the PN sequences themselves. A change in Vdet which correlates with one of the sequences is due to whichever control (phase or attenuation, I or Q attenuation) is being adjusted by that sequence. Changes due to the other sequence used for the other control will cross-correlate to zero. Also, variations due to noise or the co-polarized signal when multiplied by the sequence will likewise average to zero. Therefore, when averaged over a suitable length of time, the correlator output will be a voltage which is non-zero for a unconverged system, and zero for the converged (maximum possible cancellation) system. This voltage is integrated (shown schematically as the op-amp 74 and capacitor C1) to yield the voltage which is applied to the attenuator/phase shifter or I/Q network controls. The pseudo-noise sequences are added to this at a very low level to make only tiny changes in those control voltages. As such, the system is continuous and will always seek the best combination of control voltages for the existing condition.

Figure 8:
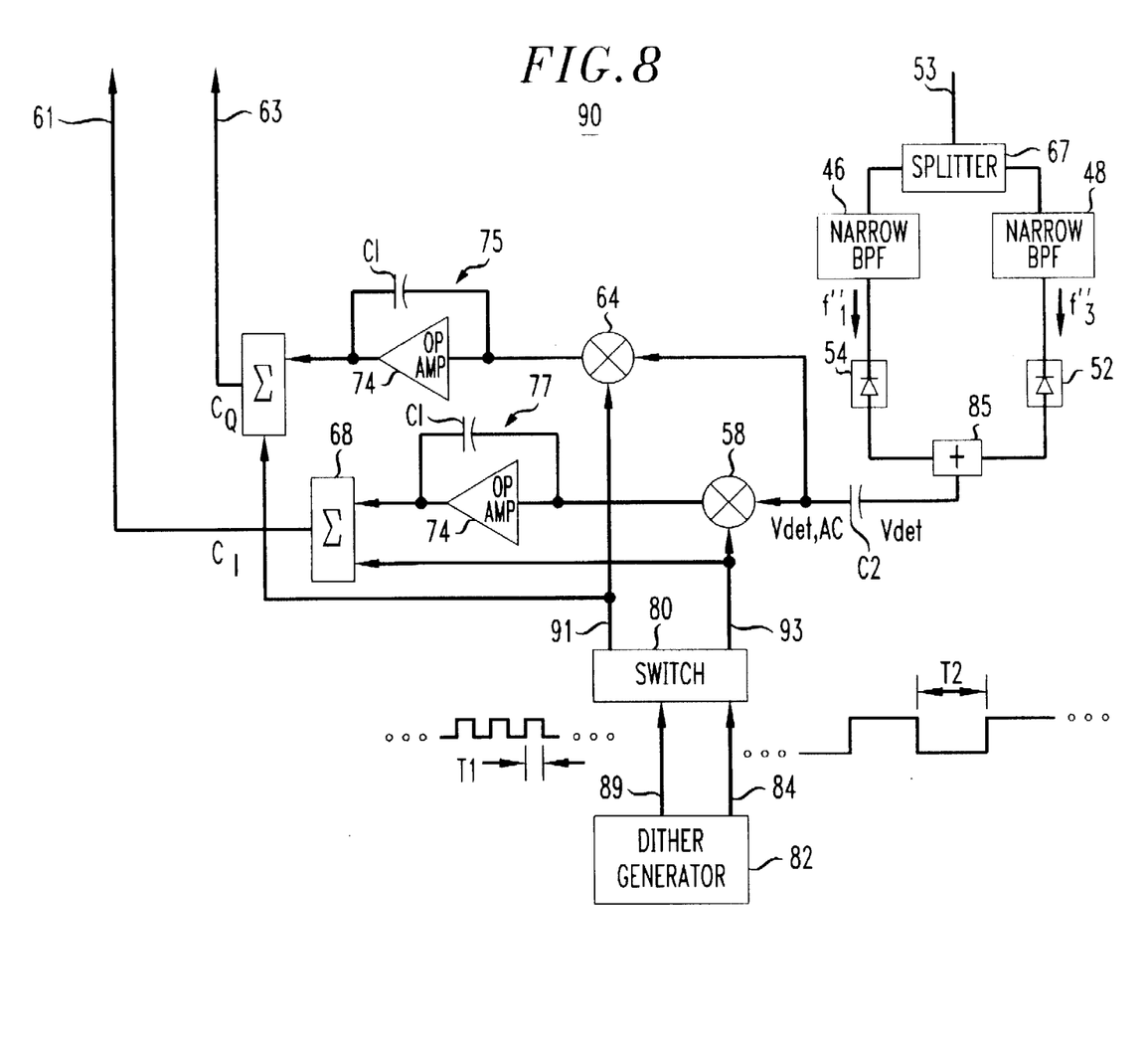

With reference now to FIG. 8, there is shown a detection and control circuit 90 which can be substituted for the detection and control block 36 of FIG. 7. The circuit 90 operates similarly to the circuit 36 of FIG. 7, except that the PN generator 70 has been replaced with a dither generator 82 and switch 80, which allows the control voltages $C_I$ and $C_Q$ to be adjusted one at a time rather than simultaneously. The dither generator 82 provides square wave voltage pulses of alternating polarity, each with pulsewidth T1, on line 89. The dither generator 82 also supplies a pulsed control voltage waveform on line 84 with alternating polarity pulses, where each control pulse has a much longer period T2 than that of the square wave pulses on line 89. The switch 80 then switches the square wave pulses between output lines 91 and 93 on transitions between the control pulses, thus supplying one square wave pulse train at a time of a given number of pulses to lines 91 and 93. When line 93 is switched to, the square wave pulses thereat produce changes in the control voltage $C_Q$, in turn producing a change in the detected undesirable cross-polarized signal as indicated by the time-varying voltage $Vdet_{AC}$. The correlator 58 then multiplies $Vdet_{AC}$ with the square wave pulses supplied from the dither generator 82, and the multiplied output is applied to the integrator 75. As this continues for the time duration T2, the integrator 75 output is incremented in the direction which gradually minimizes the time varying voltage $Vdet_{AC}$. The switch 80 then switches to the other path 91 and the process is repeated for the $C_I$ control voltage for the time interval T2. After a number of control periods T2, the control voltages $C_I$ and $C_Q$ will be optimized. The control voltages $C_I$ and $C_Q$ will then be continually adjusted to compensate for subsequent changes in cross polarization level, in a similar fashion as in the FIG. 7 embodiment.

Figure 9:
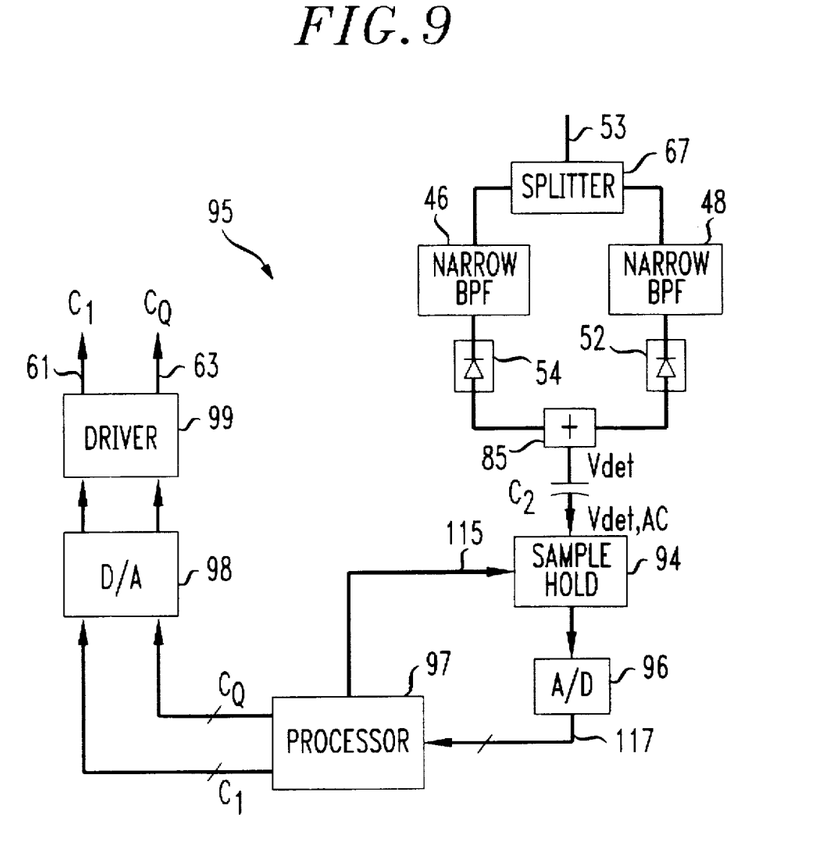

With reference now to FIG. 9, there is shown an alternate circuit 95 which can be used for the detection and control block 36 of FIG. 4. The circuit 95 provides the pair of control voltages $C_I$ and $C_Q$ on respective lines 61 and 63 to the vector attenuator 62 as was done in the embodiments of FIGS. 7 and 8. These control voltages produce the detector output voltage Vdet proportional to the unwanted signal energy in a similar manner as was explained previously. With the circuit 95, a processor 97 continuously supplies a pair of digital words corresponding to the desired control voltages $C_I$ and $C_Q$, to a digital to analog (D/A) converter 98. The D/A converter 98 converts these codewords to the voltage levels $C_I$ and $C_Q$, which are buffered by a driver 99 and supplied on respective control lines 61 and 63. The processor 97 continuously makes tiny pseudo-random perturbations to the control voltages. These perturbations produce a time varying voltage $Vdet_{AC}$ which is continuously sampled by a sample and hold circuit 94. The sampling time is controlled by the processor 97 via controlling pulses applied on control line 115. The sample and hold output voltage is then applied to the A/D converter 96, which converts it to the aforementioned digital word on line 117 that is supplied to the processor 97. The processor 97 then compares the digital words representing $Vdet_{AC}$ with the original pseudo-random perturbations, to arrive at optimum values for the control voltage $C_I$ and $C_Q$. This process continues indefinitely and the control voltages $C_I$ and $C_Q$ are continuously perturbated and optimized in accordance with changes in cross-polarization levels.

All of the above described embodiments of FIGS. 7–9 are operable to cancel unwanted noise as well as the undesirable cross polarized signal energy. If the LNB 16 of FIG. 2 is perfect and generates no noise (0 dB noise figure) there will be no reduction in signal to noise ratio (SNR) for a properly operating system. This is because noise from various sources that is coupled from one polarization into another will be canceled just as will be the undesired signal. These noise sources include satellite uplink noise, antenna noise and noise due to atmospheric losses. Noise generated by the LNB 16 will not be cancelled, however, and will degrade resultant SNR slightly for large polarization errors. This amounts to about 0.1 dB for a 10 degree polarization error in a linear polarization system, increasing to about 0.5 dB for a 20 degree error. This SNR reduction is negligible for most applications. SNR impairments in circular polarization systems are the same for axial ratios equivalent to the linear errors above.

As mentioned previously, it may be possible to eliminate the LNB 16 and/or the down converter 34 and to perform some of the signal processing functions at the received microwave frequencies (e.g., 3.7–4.2 GHz; 11.7–12.2 GHz; or 12.2–12.7 GHz bands). However, with this approach, the cost and complexity may be prohibitive for many applications.

The embodiments disclosed herein may advantageously be configured to match the typical television receive only (TVRO) architecture and make best use of its features. With signal processing done at the first IF of 950 to 1450 MHz, and error signal measurements done at the second IF of 70 MHz, all of the additional circuitry can be low cost and co-located in the receiver. Cancellation is preferably done on a single transponder basis yielding maximum cancellation depth. With older system types, a single transponder typically communicates only a single analog video signal; with modern systems, up to four or more digital video signals can be communicated with a single transponder.

From the foregoing, thus disclosed are various embodiments of a cross polarization cancellation system of the present invention which are particularly useful in a frequency reuse system, and which will correct polarization error due to misalignment, Faraday rotation, rain, or virtually any other cause. Another advantage of the present invention is that the system is self contained and does not require additional receivers, analyzers, signal processors, and so on, to determine polarization integrity. Yet another advantage is that the system is entirely non-mechanical. Still another advantage is that the system reduces system impairment due to opposite polarization signal interference to virtually zero with minimal impact on signal to noise ratio (SNR).

It will be understood that the embodiments described herein are merely exemplary and that a person skilled in the art can make many modifications and variations to the disclosed embodiments without departing from the spirit and scope of the invention. All such variations and modifications are intended to be included within the scope of the invention as defined by the appended claims.

What is claimed is:

1. In a receiving system for receiving a first electromagnetic signal having frequencies within a given frequency channel and transmitted from an external source at a first polarization, said receiving system also receiving a second electromagnetic signal having frequencies within said given frequency channel and transmitted from an external source at a second, different polarization, a cross polarization cancellation apparatus for canceling received cross polarized energy of said second signal, comprising:

antenna means for receiving said first and second signals and for providing a first antenna output signal containing received energy arriving at said antenna means at said first polarization and a second antenna output signal containing received energy arriving at said antenna means at said second polarization;

first circuit means for converting said first and second antenna output signals to first and second combiner input signals, respectively, with a controlled relative amplitude and a controlled relative phase with respect to one another;

combining means for vectorially combining signal energies of said first and second combiner input signals to produce a combiner output signal;

second circuit means for detecting signal energy of said combiner output signal at a predetermined frequency to provide a detected signal;

said first circuit means being responsive to said detected signal to optimize said controlled relative amplitude and relative phase to provide said combiner output signal with signal energy associated substantially with said first electromagnetic signal, and substantially devoid of signal energy associated with said second electromagnetic signal;

wherein said first circuit means is operable to continuously vary said relative amplitude and relative phase to produce time varying changes in said detected signal and said first circuit means includes:

pseudo-noise generation means for continuously producing pseudo-random changes in said relative amplitude and relative phase; and correlation means coupled to said pseudo-noise generation means for correlating said time-varying changes in said detected signal with said pseudo-random changes to continuously optimize said relative amplitude and phase, thereby continuously optimizing cross-polarization rejection.

2. The receiving system according to claim 1, wherein said predetermined frequency is outside a frequency range associated with said given frequency channel.

3. The receiving system according to claim 2, wherein said second circuit means includes:
   a directional coupler having an input port for receiving signal energy associated with said combiner output signal, a direct output port, and a coupled output port;
   at least one bandpass filter coupled to said coupled port, and having a resonant frequency at said frequency outside said frequency range associated with said given frequency channel, for passing energy at frequencies outside said frequency range;
   a detector coupled to said at least one bandpass filter for detecting the energy passed by said at least one bandpass filter to provide a detected voltage Vdet; and
   a capacitor coupled to said detector for passing the AC component of Vdet to provide said detected signal to said first circuit means.

4. The receiving system according to claim 3, further comprising a direct path bandpass filter coupled to said direct output port of said directional coupler, having a resonant frequency associated with a carrier frequency of said given frequency channel.

5. The receiving system according to claim 3, wherein said at least one bandpass filter comprises a first bandpass filter having a first resonant frequency at a frequency below said frequency range associated with said given frequency channel, and a second bandpass filter having a second resonant frequency at a frequency above said frequency range associated with said given frequency channel; and
   wherein said receiving system further includes splitting means connected to said coupled port, for splitting the signal at said coupled port into first and second signals, with each being applied to respective of said first and second bandpass filters.

6. The receiving system according to claim 1, wherein said first polarization comprises a first linear polarization and said second, different polarization comprises a second linear polarization orthogonal to said first linear polarization.

7. The receiving system according to claim 1, wherein said first polarization comprises circular polarization of a first sense and said second polarization comprises circular polarization of a second sense opposite said first sense.

8. The receiving system according to claim 1, wherein said first circuit means includes:
   a low noise amplifier for amplifying said first and second antenna output signals to provide first and second amplified signals, respectively;
   a local oscillator for providing a local oscillating signal;
   first and second mixers for mixing said local oscillating signal with said first and second amplified signals, respectively, to provide respective first and second intermediate frequency (IF) signals;
   wherein said first circuit means is operable to convert said first and second IF signals to said first and second combiner input signals, respectively.

9. The receiving system according to claim 8, further comprising a down-converter coupled between an output port of said combiner and said second circuit means, for translating each frequency component of said combiner output signal to a correspondingly lower frequency.

10. The receiving system according to claim 1, wherein said combining means comprises a combiner having first and second input ports and an output port and wherein said first circuit means includes a variable attenuator and a variable phase shifter coupled in series between said second antenna output port and said second combiner input port, said variable attenuator being responsive to a first control signal supplied within said first circuit means to attenuate signal energy of said second antenna output signal, said variable phase shifter being responsive to a second control signal supplied within said first circuit means to phase shift signal energy of said second antenna output signal, thereby providing said controlled relative amplitude and said controlled relative phase between said first and second combiner input signals at respective of said first and second combiner input ports.

11. The receiving system according to claim 1, wherein said combining means comprises a combiner having first and second input ports and an output port and wherein said first circuit means includes a vector attenuator coupled between said second antenna output port and said second combiner input port, having an "in-phase" (I) control port and a "quadrature phase" (Q) control port, wherein said first circuit means supplies control signals to said I and Q control ports to control attenuation and phase shifting of said second antenna output signal, thereby providing said controlled said relative amplitude and controlled relative phase between said first and second combiner input signals at respective of said first and second combiner input ports.

12. The receiving system according to claim 11, further including a delay line coupled between said first antenna output port and said first combiner input port for introducing a phase lag as a function of frequency to said first antenna output signal which tracks insertion phase characteristics of said vector attenuator as a function of frequency.

13. The receiving system according to claim 1, wherein said receiving system is capable of receiving signals of a plurality of overlapping frequency channels with generally half of said frequency channels being transmitted from an external source at said first polarization and the other half of said frequency channels being transmitted at said second, different polarization and with adjacent said frequency channels being transmitted at different of said polarizations, wherein said antenna means receives said signals of said plurality of overlapping frequency channels, said receiving system further comprising:
   a splitter network for splitting said first and second antenna output signals into a plurality of signal pairs, with each signal pair comprising first and second receiver input signals indicative of said first and second antenna output signals, respectively;
   a plurality of receivers, each for receiving one of said plurality of signal pairs;
   a plurality of each of said combining means, said first circuit means, and said second circuit means, with each one of said receivers having one of said combiner means, one of said first circuit means, and one of said second circuit means;
   each of said plurality of receivers further including a bandpass filter to filter frequencies associated with a single one of said channels.

14. The receiving system according to claim 13, wherein each said combining means comprises a combiner having first and second input ports and an output port, and wherein each receiver further includes a transfer switch having first and second transfer switch input ports adapted to receive respective of said first and second antenna output signals, and having first and second transfer switch output ports coupled respectively to said first and second combiner input ports, and further wherein said transfer switches within receivers associated with said first polarization connect said first and second transfer switch input ports to respective of said first and second transfer switch output ports, and wherein said transfer switches within receivers associated with said second polarization connect said first and second transfer switch input ports to respective of said second and first transfer switch output ports.

15. The receiving system according to claim 1, wherein:
said pseudo-noise generation means comprising a pseudo-noise generator for generating first and second uncorrelated pseudo-random voltage pulse sequences;
said correlation means comprising first and second correlators for multiplying said detected signal by respective of said first and second pseudo-random voltage pulse sequences to provide first and second multiplied signals, respectively;
said first circuit means further comprising:
first and second integrators for integrating over time said first and second multiplied signals, respectively, to provide respective first and second integrator outputs;
a first summing circuit for summing said first integrator output with said first pseudo-random voltage pulse sequence to produce a first control signal, and a second summing circuit for summing said second integrator output with said second pseudo-random voltage pulse sequence to produce a second control signal; and
an attenuation and phase shifting apparatus coupled between said antenna output ports and said combining means, for providing said first and second combiner input signals at said controlled relative amplitude and said controlled relative phase responsive to said first and second control signals.

16. In a transceiver system including a receiving apparatus for receiving signals of a plurality of overlapping frequency channels, with generally half of said frequency channels being transmitted at a first polarization and the other half of said frequency channels being transmitted at a second, different polarization and with adjacent of said frequency channels being transmitted at different of said polarizations, a polarization correction system for providing output signals associated with particular ones of said frequency channels substantially devoid of signal energy associated with other ones of said frequency channels, comprising:
at least one antenna for receiving said signals of said plurality of overlapping frequency channels, and for providing first and second antenna output signals containing received energy arriving at said at least one antenna at respective of said first and second polarizations;
a splitter network for splitting said first and second antenna output signals into a plurality of signal pairs, with each signal pair comprising first and second receiver input signals indicative of said first and second antenna output signals, respectively;
a plurality of receivers, each for receiving one of said plurality of signal pairs;
each of said receivers including a combiner having first and second input ports and an output port;
each of said receivers including a first circuit arrangement for converting associated first and second receiver input signals to first and second combiner input signals, respectively, at respective of said first and second combiner input ports, with a controlled relative amplitude and a controlled relative phase with respect to one another, wherein said combiner vectorially combines signal energies of said first and second combiner input signals to provide a combiner output signal at said output port;
each of said receivers including a second circuit arrangement for detecting signal energy of said combiner output signal at a predetermined frequency associated with that receiver to provide a detected signal;
wherein said first circuit arrangement of each receiver is responsive to said detected signal to optimize said controlled relative amplitude and relative phase by continuously varying the relative amplitude and relative phase to produce time varying changes in said detected signal, said first circuit arrangement including:
pseudo-noise generation means for continuously producing pseudo-random changes in said relative amplitude and relative phase; and
correlation means coupled to said pseudo-noise generation means for correlating said time-varying changes in said detected signal with said pseudo-random changes to continuously optimize said relative amplitude and phase, thereby continuously optimizing cross-polarization rejection;
whereby said combiner output signal of each receiver contains signal energy associated substantially with at least one of said frequency channels transmitted at one of said first or second polarizations, and is substantially devoid of signal energy associated with said frequency channels transmitted with the other one of said first or second polarizations.

17. In a receiving system capable of receiving a first electromagnetic signal having frequencies within a given frequency channel and transmitted from an external source at a first polarization, said receiving system also receiving a second electromagnetic signal having frequencies within said given frequency channel and transmitted from an external source at a second, different polarization, a cross polarization cancellation apparatus for canceling received cross polarized energy of said second signal, comprising:
at least one antenna for receiving said first and second signals and for providing a first antenna output signal containing received energy arriving at said antenna means at said first polarization and a second antenna output signal containing received energy arriving at said at least one antenna at said second polarization;
a first circuit arrangement for converting said first and second antenna output signals to first and second combiner input signals, respectively, with a controlled relative amplitude and a controlled relative phase with respect to one another;
a combiner for vectorially combining signal energies of said first and second combiner input signals to produce a combiner output signal;
a second circuit arrangement for detecting signal energy of said combiner output signal at a predetermined frequency to provide a detected signal;
said first circuit arrangement being responsive to said detected signal to optimize said controlled relative amplitude and relative phase to provide said combiner output signal with signal energy associated substantially with said first electromagnetic signal, and substantially devoid of signal energy associated with said second electromagnetic signal;

wherein said first circuit arrangement is operable to continuously vary said relative amplitude and relative phase to produce time varying changes in said detected signal, and said first circuit arrangement includes:

a dither generator for generating a sequence of voltage pulses;

a switch coupled to said dither generator for periodically switching said sequence of voltage pulses between a first switch output port and a second switch output port;

first and second correlators coupled to respective of said first and second switch output ports, for multiplying said detected signal by said sequence of voltage pulses switched thereto to provide first and second multiplied signals, respectively;

first and second integrators for integrating over time said first and second multiplied signals, respectively, to provide respective first and second integrator outputs;

a first summing circuit coupled to said first switch output port and to said first integrator for summing said first integrator output with said sequence of voltage pulses switched to said first switch output port to produce a first control signal, and a second summing circuit coupled to said second switch output port and to said second integrator, for summing said second integrator output with said sequence of voltage pulses switched to said second switch output port to produce a second control signal; and an attenuation and phase shifting apparatus coupled between said antenna output ports and said combiner, for providing said first and second combiner input signals at said controlled relative amplitude and said controlled relative phase responsive to said first and second control signals.

18. The apparatus of claim 17, wherein said dither generator is operative to output square wave pulses at a first period to be applied to said correlators via said switch, and to output a pulsed control waveform with pulses at a second period longer than said first period for application to said switch to control switching of said switch between said first said second correlators.

19. The receiving system according to claim 16, wherein:

said pseudo-noise generation means comprising a pseudo-noise generator for generating first and second uncorrelated pseudo-random voltage pulse sequences;

said correlation means comprising first and second correlators for multiplying said detected signal by respective of said first and second pseudo-random voltage pulse sequences to provide first and second multiplied signals, respectively;

said first circuit arrangement further comprising:

first and second integrators for integrating over time said first and second multiplied signals, respectively, to provide respective first and second integrator outputs;

a first summing circuit for summing said first integrator output with said first pseudo-random voltage pulse sequence to produce a first control signal, and a second summing circuit for summing said second integrator output with said second pseudo-random voltage pulse sequence to produce a second control signal; and an attenuation and phase shifting apparatus coupled between said antenna output ports and said combiner, for providing said first and second combiner input signals at said controlled relative amplitude and said controlled relative phase responsive to said first and second control signals.

* * * * *